M. H. MATHISEN.
TRACTION WHEEL.
APPLICATION FILED JUNE 10, 1918.

1,290,273.

Patented Jan. 7, 1919.

Witnesses
J. H. Crawford

Inventor
M. H. Mathisen,
By A. B. Foster
Attorney

UNITED STATES PATENT OFFICE.

MARTIN H. MATHISEN, OF LANKERSHIM, CALIFORNIA.

TRACTION-WHEEL.

1,290,273. Specification of Letters Patent. Patented Jan. 7, 1919.

Application filed June 10, 1918. Serial No. 239,196.

*To all whom it may concern:*

Be it known that I, MARTIN H. MATHISEN, a citizen of the United States, residing at Lankershim, in the county of Los Angeles and State of California, have invented certain new and useful Improvements in Traction-Wheels, of which the following is a specification.

This invention relates to traction wheels, and the broad object in view is to provide in conjunction with an axle driven traction wheel for motor vehicles and the like, a novel form and arrangement of traction members together with means actuated by the vehicle driving axle for automatically projecting portions of said traction members beyond the periphery of the wheel when power is transmitted to said axle.

A further object of the invention is to provide means for locking said traction members in their projected positions, thereby enabling the vehicle to be driven in a rearward direction.

Another object of the invention is to provide means whereby the degree of projection of said traction members may be regulated to suit any particular vehicle in connection with which the wheel is used and also to suit the road conditions in various parts of the country.

One of the main objects of the invention is to provide traction members of such formation that they will not injure the road surface but will merely penetrate the road surface to a practical traction imparting depth without plowing the road surface or forming furrows or gutters therein. The construction also provides for maintaining the traction members in a clean condition, any dirt, or other material adhering thereto being automatically scraped therefrom in the retracting movement of said traction members.

With the above and other objects in view, the invention consists in the construction, combination and arrangement of parts, as herein described, illustrated and claimed.

Figure 1:
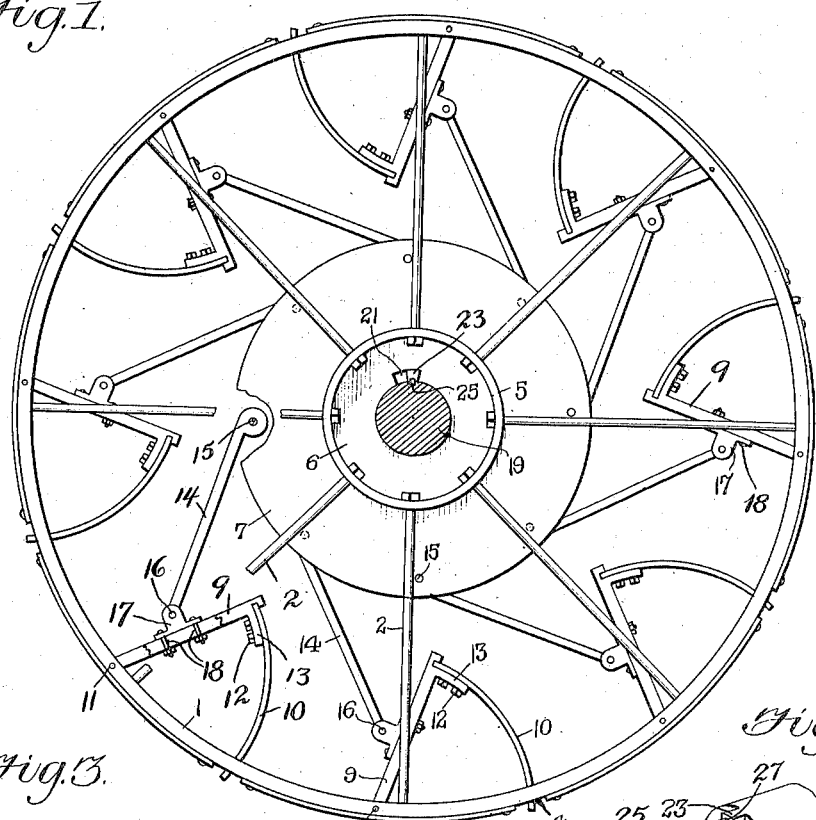
Figure 1 is a side elevation of the improved traction wheel.
Figures 2, 3, 4:
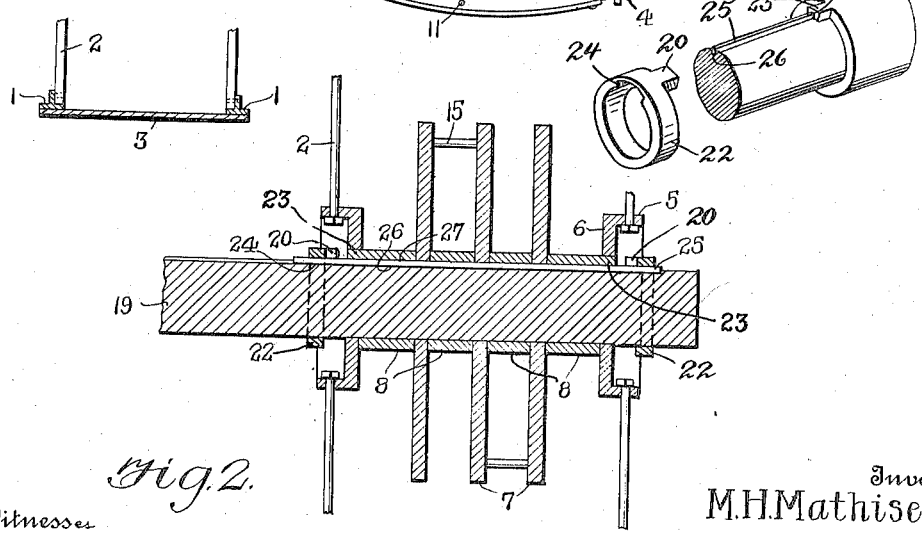
Fig. 2 is a fragmentary diametrical section taken through the wheel hub and driving axle.
Fig. 3 is a fragmentary cross section through the rim of the wheel, showing the formation thereof.
Fig. 4 is a detail perspective view showing the locking means for preventing relative rotative movement between the driving axle and the wheel hub.

While the construction of the main body of the wheel may be varied without departing from the spirit of this invention, I have shown the wheel as comprising a pair of rim forming members 1 to which the outer extremities of the spokes 2 are fixedly connected. The rim forming members 1 are connected together in rigid relation to each other by rim plates 3, said plates being riveted or otherwise fastened to the rim forming members 1 and enabling the latter to be spaced at any suitable distance apart according to the desired width of the rim of the traction wheel. The plates 3 are adapted to support a tire, (not shown), of any kind. The plates 3 may be of any number and their adjacent ends are arranged in spaced relation to each other as indicated in Fig. 1, to provide openings 4 through which portions of the traction members hereinafter described are adapted to be projected for obtaining the necessary tractive hold on the road surface. The spokes 2 are fastened at their inner ends to flanges 5 of the hub which is shown in Fig. 2 as comprising the disk shaped end members or heads 6, a plurality of disk shaped flanges 7 and spacing sleeves or tubular hub forming members 8 by means of which the members 6 and 7 are held in laterally spaced relation to each other as shown in said Fig. 2.

Pivotally connected to the rim of the wheel are carriers 9 for a corresponding series of traction members 10. Each carrier 9 is connected at its outer end to the rim of the wheel by a pivot 11. Each traction member 10 is secured by fastening means 12 to a lateral arm or extension 13 of the respective carrier 9, and is curvilinear, being described on the arc of a circle of which the pivot 11 is the center. By reason of the construction just described, each traction member 10 is adapted to be projected beyond the periphery of the wheel and to merely penetrate the road surface to the necessary extent to obtain a firm hold thereon without any dragging action which would tend to plow the road surface and form gutters or furrows therein with consequent injury to the road surface, the projecting extremities of the traction members 10 being retracted or withdrawn accurately from the holes formed thereby in the road surface. In connection with each carrier 9, I employ a carrier actuating link 14 which is attached at its inner end to a pivot pin 15 extending between two of the flanges or disks 7 as shown in Fig. 2. The pins 15 are staggered to leave ample working room and clearance for the operating means of the traction members 10. Each link 14 is attached at its outer extremity by means of a pivot 16 to a clip 17 secured by fastening means 18 which permit said clip to be adjusted longitudinally of the respective carrier 9 in order to locate the pivots 16 nearer or farther from the pivots 11, and thereby provide for varying the ratio of movement between the carriers 9 and the hub of the wheel. This enables any desired degree of projection to be obtained for the traction members 10 in accordance with the nature of the roadway and the character of the vehicle upon which the traction wheel is used.

Under certain conditions especially when reversing the direction of movement of the vehicle, it is important to lock the traction members 10 in their projected positions. This I accomplish by providing means for temporarily preventing relative rotative movement between the hub of the wheel and the driving axle 19. The means illustrated in the drawings comprises one or more lugs 23 on the hub members 8 and one or more stops or plugs 20 which are movable into and out of an adjacent slot 21 in the end or flange 6 of the wheel hub. Said stop or plug is provided with a guide 22 slidable in relation to the axle 19 and having a groove 24 to receive a pin or key 25 which is received in grooves or keyways 26 and 27 in the axle 19 and the wheel hub. The members 7 and 8 are keyed to one another and the axle 19, while the slot 21 allows a relative rotative movement between the above mentioned members and the flanges 6. The normal position of the parts just described is illustrated in Figs. 1 and 2. To lock the hub members 6 of the wheel in relation to the driving axle, power is applied to the axle 19 until the lugs 23 move to the opposite ends of the slots 21. Then the stops or plugs 20 are pushed into the unoccupied portions of said slots 21 so as to prevent the return movement of the hub. Thus, the traction members 10 are locked in their projected positions and will therefore provide the necessary traction when the direction of rotation of the wheel is reversed as in backing a vehicle. The slots 21 are formed in the opposite ends of the heads 6 so as to receive the plugs or stops 20 when the latter are pushed inwardly toward the center of the wheel. By pushing the plugs 20 into the slots 21 while the traction members are in a retracted position, said traction members may be locked in such position.

I claim:

1. The combination with a vehicle wheel, and a driving axle therefor, of pivotally mounted carriers, traction members extending from said carriers and adapted to be projected and retracted in relation to the outer periphery of the wheel, means between the said axle and carriers whereby the traction members are projected with respect to the rim when the axle is rotated, and means for locking said traction members against movement.

2. The combination with a vehicle axle, and a traction wheel driven thereby, of carriers each pivotally attached at one end to the rim of said wheel, curvilinear traction members having a fixed relation to and extending from said carriers and each described on and movable in the arc of a circle of which the pivot of the respective carrier is the center, and connecting means between said axle and carriers whereby portions of the traction members are projected beyond the periphery of the wheel when power is applied to said axle.

3. The combination with a vehicle axle, and a traction wheel driven thereby, of carriers each pivotally attached at one end to the rim of said wheel, curvilinear traction members extending from said carriers and each described on the arc of a circle of which the pivot of the respective carrier is the center, connecting means between said axle and carriers whereby portions of the traction members are projected beyond the periphery of the wheel when power is applied to said axle, and means for adjusting the ratio of movement between said axle and carriers.

4. The combination with a vehicle axle, and a traction wheel driven thereby, of carriers each pivotally attached at one end to the rim of said wheel, curvilinear traction members extending from said carriers and each described on the arc of a circle of which the pivot of the respective carrier is the center, connecting means between said axle and carriers whereby portions of the traction members are projected beyond the periphery of the wheel when power is applied to said axle, and means for locking said traction members in a projected position.

5. The combination with a vehicle axle, and a traction wheel driven thereby, of carriers each pivotally attached at one end to the rim of said wheel, curvilinear traction members extending from said carriers and each described on the arc of a circle of which the pivot of the respective carrier is the center, connecting means between said axle and carriers whereby portions of the traction members are projected beyond the periphery of the wheel when power is applied to said axle, said connecting means comprising a member partially rotatable on the wheel hub, pivotal links attached to said partially rotatable member and to said carrier, and means for adjusting the throw of said traction members.

6. The combination with a vehicle axle, and a traction wheel driven thereby, of carriers each pivotally attached at one end to the rim of said wheel, curvilinear traction members extending from said carriers and each described on the arc of a circle of which the pivot of the respective carrier is the center, connecting means between said axle and carriers whereby portions of the traction members are projected beyond the periphery of the wheel when power is applied to said axle, said connecting means comprising a member partially rotatable on the wheel hub, and pivotal links attached to said partially rotatable member and to said carrier, the points of attachment between said links and carriers being adjustable toward and away from the pivots of the carriers.

7. The combination with a vehicle axle, and a traction wheel driven thereby, of carriers each pivotally attached at one end to the rim of said wheel, curvilinear traction members extending from said carriers and each described on the arc of a circle of which the pivot of the respective carrier is the center, connecting means between said axle and carriers whereby portions of the traction members are projected beyond the periphery of the wheel when power is applied to said axle, said connecting means comprising a member partially rotatable on the wheel hub, pivotal links attached to said partially rotatable member and to said carrier, and means for locking said partially rotatable member in relation to the wheel hub to prevent movement of said traction members.

8. The combination with a vehicle axle, and a traction wheel driven thereby, of traction members adapted to be projected and retracted in relation to the periphery of the wheel rim, connecting means between said axle and traction members adapted when power is applied to the axle to project the traction members, and means for locking said traction members against movement.

In testimony whereof I affix my signature.

MARTIN H. MATHISEN.